(12) United States Patent
Neumann et al.

(10) Patent No.: US 9,091,554 B2
(45) Date of Patent: Jul. 28, 2015

(54) SAFETY-CRITICAL UPDATING OF MAPS VIA A DATA CHANNEL OF A SATELLITE NAVIGATION SYSTEM

(75) Inventors: Karl-Thomas Neumann, Glashütten (DE); Marc Menzel, Marburg (DE); Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 700 days.

(21) Appl. No.: 12/677,942

(22) PCT Filed: Sep. 11, 2008

(86) PCT No.: PCT/EP2008/062066
§ 371 (c)(1),
(2), (4) Date: Mar. 12, 2010

(87) PCT Pub. No.: WO2009/037186
PCT Pub. Date: Mar. 26, 2009

(65) Prior Publication Data
US 2010/0217523 A1 Aug. 26, 2010

(30) Foreign Application Priority Data

Sep. 13, 2007 (DE) .......................... 10 2007 043 825
Sep. 11, 2008 (DE) .......................... 10 2008 046 896

(51) Int. Cl.
*G01C 21/30* (2006.01)
*G01C 21/32* (2006.01)

(52) U.S. Cl.
CPC ..................................... *G01C 21/32* (2013.01)

(58) Field of Classification Search
CPC .............................................. H04N 21/6143
See application file for complete search history.

(56) References Cited

U.S. PATENT DOCUMENTS

| | | | | |
|---|---|---|---|---|
| 5,248,981 A | * | 9/1993 | Yoshihara et al. | 342/357.25 |
| 5,398,035 A | * | 3/1995 | Densmore et al. | 343/713 |
| 5,898,680 A | * | 4/1999 | Johnstone et al. | 370/316 |
| 6,021,371 A | * | 2/2000 | Fultz | 701/467 |
| 6,075,467 A | * | 6/2000 | Ninagawa | 340/995.14 |
| 6,230,098 B1 | | 5/2001 | Ando et al. | |
| 6,249,771 B1 | * | 6/2001 | Kurihara | 705/7.29 |
| 6,323,803 B1 | * | 11/2001 | Jolley et al. | 342/357.42 |
| 6,480,783 B1 | * | 11/2002 | Myr | 701/117 |
| 6,519,262 B1 | * | 2/2003 | Stephens et al. | 370/442 |

(Continued)

FOREIGN PATENT DOCUMENTS

DE     198 42 430 A1     3/1999

OTHER PUBLICATIONS

Best, S.W.: Galileo Phase 1—eine Bestandsaufnahme. In.elektronik industrie 4, 2005, S.-56-59 S.58 Tab. "Vergleich der wesentlichen Parameter von Gate, Galileo, Glonass u.GPS", S.59, re.SP., Z.22-25.

(Continued)

*Primary Examiner* — Jonathan L Sample
(74) *Attorney, Agent, or Firm* — RatnerPrestia

(57) ABSTRACT

A device, system and method for an update system for updating a digital map for a vehicle. The update data is sent from a control center via a satellite navigation system to the individual receivers. The update data is received by the receivers in parallel with the position data from the satellites. For this purpose, a subchannel is provided. This allows large portions of the worldwide population to be supplied with the update data.

15 Claims, 2 Drawing Sheets

(56) References Cited

U.S. PATENT DOCUMENTS

| | | | |
|---|---|---|---|
| 6,614,361 B1* | 9/2003 | Kinugawa | 340/870.16 |
| 6,704,737 B1* | 3/2004 | Nixon et al. | 707/656 |
| 6,766,248 B2* | 7/2004 | Miyahara | 701/532 |
| 7,124,426 B1* | 10/2006 | Tsuria et al. | 725/75 |
| 7,127,460 B2* | 10/2006 | Nixon et al. | 1/1 |
| 7,146,274 B2* | 12/2006 | Linkohr | 701/453 |
| 7,242,348 B2* | 7/2007 | Nagahara | 342/357.46 |
| 7,373,247 B2* | 5/2008 | Park | 701/451 |
| 7,495,608 B1* | 2/2009 | Chen et al. | 342/357.43 |
| 7,504,996 B2* | 3/2009 | Martin | 342/357.25 |
| 7,610,147 B2* | 10/2009 | Umezu et al. | 701/450 |
| 7,778,216 B2* | 8/2010 | Cho | 370/328 |
| 7,856,248 B1* | 12/2010 | Fujisaki | 455/556.1 |
| 2002/0003495 A1* | 1/2002 | Johnstone et al. | 342/357.13 |
| 2002/0091485 A1* | 7/2002 | Mikuriya et al. | 701/208 |
| 2002/0169778 A1* | 11/2002 | Natesan et al. | 707/10 |
| 2003/0004952 A1* | 1/2003 | Nixon et al. | 707/10 |
| 2003/0028316 A1* | 2/2003 | Miyahara | 701/208 |
| 2003/0158657 A1* | 8/2003 | Agnew et al. | 701/208 |
| 2005/0085994 A1* | 4/2005 | Kimura | 701/208 |
| 2005/0174286 A1* | 8/2005 | Lokshin et al. | 342/357.12 |
| 2006/0012517 A1* | 1/2006 | Nagahara | 342/357.09 |
| 2006/0270457 A1* | 11/2006 | Lord | 455/558 |
| 2006/0288014 A1* | 12/2006 | Edwards et al. | 707/100 |
| 2007/0005609 A1* | 1/2007 | Breed | 707/10 |
| 2007/0016361 A1 | 1/2007 | Lee et al. | |
| 2007/0243822 A1* | 10/2007 | Monte et al. | 455/12.1 |
| 2008/0015771 A1* | 1/2008 | Breed et al. | 701/207 |
| 2008/0129586 A1* | 6/2008 | Martin | 342/357.03 |
| 2010/0007554 A1* | 1/2010 | Wang et al. | 342/357.12 |
| 2010/0217523 A1* | 8/2010 | Neumann et al. | 701/208 |
| 2011/0184644 A1* | 7/2011 | McBurney et al. | 701/208 |

OTHER PUBLICATIONS

Antonini, M., et al. "Communications within the Galileo Locally Assisted Services, IEEE Aerospace Conference Proceedings", 2004, pp. 1312-1321.

* cited by examiner

SAFETY-CRITICAL UPDATING OF MAPS VIA A DATA CHANNEL OF A SATELLITE NAVIGATION SYSTEM

CROSS REFERENCE TO RELATED APPLICATIONS

This application is the U.S. national phase application of PCT International Application No. PCT/EP2008/062066, filed Sep. 11, 2008, which claims priority to German Patent Application No. 10 2007 043 825.9, filed Sep. 13, 2007, and German Patent Application No. 10 2008 046 896.7, filed Sep. 11, 2008, the contents of such applications being incorporated by reference herein.

FIELD OF THE INVENTION

The invention relates to navigation and assistance technology for vehicles. In particular, the invention relates to a control center for an update system for updating a digital map for a vehicle, an update device for an update system for updating a digital map for a vehicle, an update system for updating a digital map, a use, a method, a computer program product and a computer-readable medium.

BACKGROUND OF THE INVENTION

The rapid increase in vehicle traffic on the roads and the associated queues and travel time extensions are resulting in increased efforts worldwide to identify traffic states and take them into account for the route selection or for route calculation in navigation systems. It is also possible to take account of these traffic states in driver assistance systems.

Digital maps, which are used for navigation systems and driver assistance systems, are usually already outdated when they are delivered. For this reason, an update for the map is indispensable if the digital map is intended to correspond to the current circumstances. Such an update is usually provided by selling storage media on which the update data are stored.

What is known as a traffic message channel (TMC) can be used to send coded traffic messages, inaudibly, at the same time as the radio programs. However, TMC can only ever be used to cover a limited area, since the range of radio signals is limited.

SUMMARY OF THE INVENTION

It is an object of at least one aspect of the invention to specify improved provision of update data for a digital map.

In one or more embodiments, the invention relates to a control center for an update system for vehicle for updating a digital map, an update device for an update system, an update system, a use, a method, a computer program product and a computer-readable medium.

The exemplary embodiments described relate in equal measure to the control center, the update unit, the update system, the use, the method, the computer program product and the computer-readable medium.

In line with one exemplary embodiment of the invention, a control center for an update system for a vehicle for updating a digital map is specified, wherein the control center has a first communication unit for transmitting update data via a data channel in a satellite navigation system to a second communication unit of an update unit in the vehicle, wherein the second communication unit is designed to receive the update data and wherein the update unit is designed to update the digital map on the basis of the received update data.

In other words, the control center can be used to partially or else completely update digital maps from vehicle navigation systems or driver assistance systems by virtue of the update data being sent from the control center via one or more satellites to the relevant vehicle. In this case, the satellite sends position statements in the manner of a GPS satellite. In addition, the update data are sent.

The data which are broadcast by the satellites (position statements and also the update data) are received by all vehicles whose communication units are set to the relevant satellites. In this way, the relevant information can be forwarded very quickly to a large population mass worldwide.

The term "digital maps" is also intended to be understood to mean maps for advanced driver assistance systems (ADAS), without any navigation taking place.

By way of example, the vehicle is a motor vehicle, such as a car, bus, or heavy goods vehicle, or else is a rail vehicle, a ship, an aircraft, such as a helicopter or airplane, or, by way of example, is a bicycle.

In line with a further exemplary embodiment of the invention, the data channel used for transmitting the update data is a subchannel of a main data channel in the satellite navigation system. Thus, the main channel is firstly used to send the position statements. The subchannel or ancillary channel is used to send the update data, independently of the position statements sent. By way of example, these update data are supplied to the relevant satellites or sent to the relevant satellites by the control center.

In line with a further exemplary embodiment of the invention, the satellite navigation system is the Galileo satellite navigation system. The European Union's Galileo satellite navigation system provides the option of additional data channels which can be used to send map updates or other update data.

By way of example, the update data are safety-critical data. Safety-critical data within the context of the present invention are data which have a great effect on a large number of subscribers. Examples of such safety-critical data, safety-critical updates or safety-critical dynamic information are natural disasters, such as volcano eruptions, tropical storms, hurricanes, landslides, storm tides or forest fires. A further example is collapsed bridges. The update data may also include information about hazardous goods in the air or on the road, e.g. as a result of a hazardous goods transporter having had an accident or as a result of accidents on factory premises. This method can also be used to transmit information about large fires, expressway or highway pile-ups or else oncoming disasters, such as a tsunami.

In line with one exemplary embodiment of the invention, the update data are dynamic data. The term "dynamic data" is intended to be understood to mean points of interest (POIs), for example, which are linked to the digital map.

These points of interest can be used to depict changes in the map data. By way of example, these points of interest, having been received in the update unit, may be stored on another medium or another appliance, like the digital map data per se. This allows map updating to be performed without altering the original data of the digital map in the process.

By way of example, the dynamic points of interest are GEO-referenced point objects, which are used to represent location-dependent information. The points of interest can be shown or concealed by the system on a location-related map. The presentation of the points of interest is dynamic in this case. This means that the dynamic points of interest are created, erased or changed by the user or by the system.

In line with a further exemplary embodiment of the invention, the control center is designed to transmit the update data to particular, selected cells.

By way of example, the update data may be provided with a particular identifier or with a particular encryption, so that the relevant receiver recognizes whether or not the data are intended for it.

It is also possible, as in the case of TMC, for there to be a fixed number of cells which can be addressed using a fixed, defined and standard identification number. An advantage of this practice is the low bandwidth required. Depending on the size of the cells, the local resolution achieved is obtained.

In other words, the digital map can be broken down into a multiplicity of cells and/or possible road segments. The update data are transmitted to all receivers. In this context, the update data are sent accompanied by a piece of information indicating which road segment or which cell is affected by said update.

In line with a further exemplary embodiment of the invention, the control center is designed to transmit the update data for a particular local area using an addressing function.

By way of example, the addressing function is based on an NMEA string. NMEA is an association of electronics manufacturers and dealers in the shipping industry (National Marine Electronics Association).

In other words, the location of the update is indicated as an NMEA string or the like. An advantage in this context is the high level of accuracy of the position information.

In line with a further exemplary embodiment of the invention, the control center is designed to compress the update data prior to the transmission. In this way, it is possible to reduce the volume of data to be transmitted, which allows the update speed to be increased.

In line with a further exemplary embodiment of the invention, the control center is designed to persistently transmit the update data.

If large volumes of data are involved, the transmission of the update data can take days or even weeks. In this case, the update units in the receivers monitor this data stream even in standby mode.

In line with a further exemplary embodiment of the invention, the control center is designed to regionally transmit the update data via a particular, selected satellite. It is also possible for a plurality of satellites to be selected.

This allows the update data to be transmitted only to receivers in a particular, regional area, such as Central Europe.

In line with a further exemplary embodiment of the invention, the update data are selected from the group comprising safety-critical information and longer-term known changes in road course and road properties.

In line with a further exemplary embodiment of the invention, an update device for an update system for a vehicle for updating a digital map is specified, wherein the update device has a second communication unit in the vehicle for receiving update data from a first communication unit of a control center via a data channel in a satellite navigation system. In addition, the update device has an update unit for updating the digital map on the basis of the received update data.

Such an update device can be installed in a vehicle.

In line with a further exemplary embodiment of the invention, the update device is designed to constantly receive the update data even in the standby mode. In this way, it is possible to receive large volumes of data over a relatively long time without the need for the update device to be constantly fully operational.

In line with a further exemplary embodiment of the invention, an update system for updating a digital map for a vehicle is specified which has a control center as described above with a first communication unit and an update device as described above with a second communication unit, wherein the first communication unit of the control center is designed to transmit update data via a data channel in the satellite navigation system to the second communication unit of the update device in the vehicle. In this case, the second communication unit is designed to receive the update data, wherein the update data is designed to update the digital map on the basis of the received update data.

In line with a further exemplary embodiment of the invention, the use of a control center as described above for updating a digital map for a vehicle is specified.

In line with a further exemplary embodiment of the invention, a method for updating a digital map for a vehicle is specified in which update data are transmitted via a data channel in a satellite navigation system from a control center to a second communication unit of an update device in the vehicle, the update data are received in the vehicle and the digital map is updated on the basis of the received update maps.

In line with a further exemplary embodiment of the invention, a computer program product is specified which, when executed on a processor, instructs the processor to perform the method steps indicated above.

In line with a further exemplary embodiment of the invention, a computer-readable medium is specified which stores a computer program product which, when executed on the processor, instructs the processor to form the method steps indicated above.

A fundamental consideration of the invention is that a data channel in a satellite navigation system is used to send safety-critical map updates. By using the data channels of Galileo, for example, for safety-critical map updates or safety-critical dynamic information, it is possible to reach a large population mass worldwide with this information very quickly.

BRIEF DESCRIPTION OF THE DRAWINGS

The invention is best understood from the following detailed description when read in connection with the accompanying drawings. Included in the drawings is the following figures.

Figure 1:
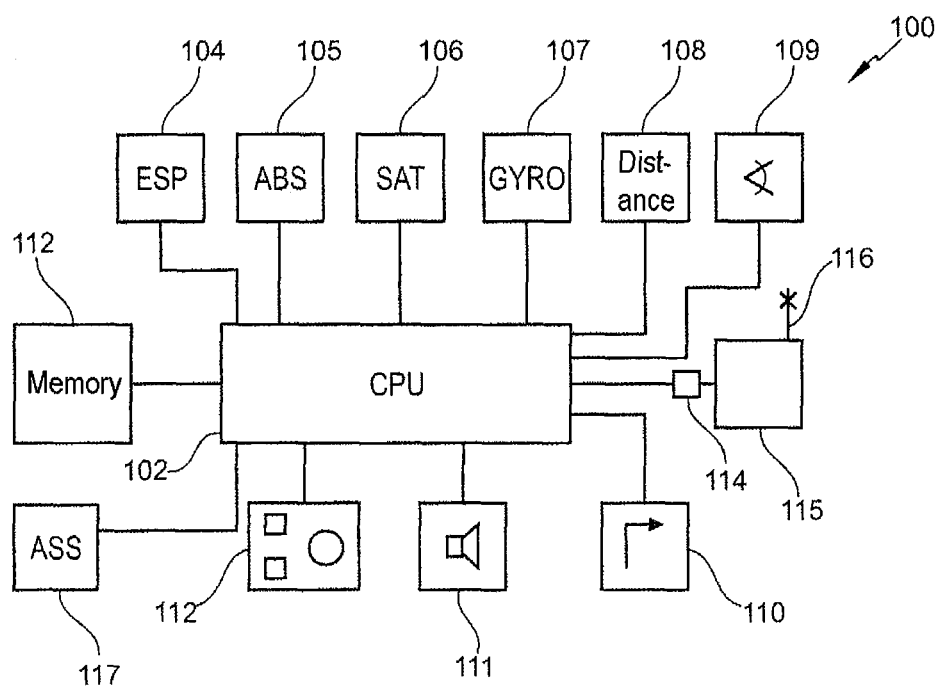
FIG. 1 shows a schematic illustration of an update device based on an exemplary embodiment of the invention.

The illustrations in the figures are schematic and not to scale.

DETAILED DESCRIPTION OF THE PREFERRED EMBODIMENTS

In the description of the figures which follows, the same reference numerals are used for the same or similar elements.

FIG. 1 shows a schematic illustration of components of an update device based on an exemplary embodiment of the invention. By way of example, the update device 100 is installed in a vehicle and is used for updating a digital navigation map. The update device 100 has a controller (CPU) 102 which at least partially forms an update unit.

The controller 102 has an input unit 112 connected to it. The input unit 112 can be used to perform various adjustments for the update device and to select a destination and possibly also a location for a navigation unit of the update device, for example. In this case, the destination can be input by inputting the full name of the destination, for example, or else by selecting from a list which is shown on a visual output unit such as a monitor 110. The monitor 110 is also used to output the routing information. Furthermore, the routing information can also be output via an audible output unit 111. Output via the audible unit 111 has the advantage that the driver is distracted less from what is currently happening in the traffic. A memory element 113, which is connected to the central computation unit (control unit) 102 or is integrated in the control unit, stores the map data (navigation map data) in the form of data records. By way of example, the memory element 113 also stores additional information about traffic restrictions and the like in association with the data records.

In addition, a driver assistance system 117 is provided which is supplied with the update data.

For the purpose of determining the current vehicle position, the update device 100 has a navigation unit with a satellite navigation receiver 106, which is designed to receive navigation signals from Galileo satellites, for example. Naturally, the navigation unit with the satellite navigation receiver 106 may also be designed for other satellite navigation systems, provided that these provide an additional data channel for transmitting the update data.

Since the navigation signals cannot always be received in city centers, for example, the update device also has a direction sensor 107, a distance sensor 108 and possibly also a steering wheel angle sensor 109 for the purpose of performing compound navigation. Signals from the receiver 106, from the distance sensor and from the direction sensor and also from the steering wheel angle sensor are handled in the central controller 102, for example. The vehicle position ascertained from said signals is aligned with the road maps using map matching. The routing information obtained in this manner is finally output via the monitor 110.

Since the navigation map data are normally static and therefore quickly outdated, the invention allows these map data to be always kept up-to-date.

The driver assistance system 117 requires the update data and the digital map data in order to assist the driver in controlling the vehicle, for example in determining speed or setting the cornering light. Examples of a driver assistance system are traction control, such as ABS (Antilock Braking System) 105, TCS (Traction Control System), ESP (Electronic Stability Program, may also contain traction control system) 104 or EDL (Electronic Differential Lock). In addition, the driver assistance system may be provided for the purpose of controlling the light (adaptive cornering light, switching the headlights on and off, high beam assistant, information system, etc). In addition or as an alternative, the driver assistance system may provide additional convenience and safety, for example by virtue of cruise control or adaptive cruise control ACC, a parking assistant, for example with ultrasound sensors for obstacle and distance recognition, a braking assistant or a distance alerter.

In addition, a communication unit 115 with an antenna 116 for receiving the update data is provided. The cryptography unit 114 can be used to decrypt received data and encrypt data which is to be sent. This allows the danger of misuse to be avoided.

In particular, the position receiver and the data receiver may be in the form of one appliance or may have at least one (common) antenna.

Figure 2:
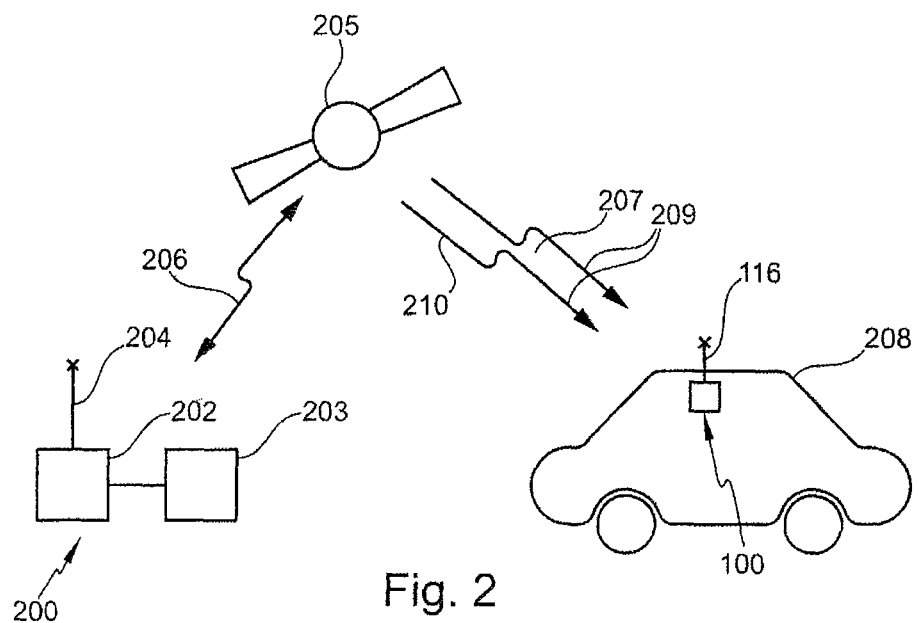
FIG. 2 shows a schematic illustration of an overall system based on an exemplary embodiment of the invention.

FIG. 2 shows a schematic illustration of an overall system which has a receiver 208 with an update device 100, has a control center 201 and has one or more satellites 205.

The control center 201 has a communication unit 202 with an appropriate antenna 204 and also has a central server 203. The control center sends the update data via the transmission link 206 to the satellite 205. The satellite 205 transmits the position data via the transmission link 207 in a main transmission channel 209 to the receiver 208, which is a vehicle. In parallel with the position data, the update data are transmitted from the control center 201 (likewise via the transmission link 207) in a subchannel 210.

In other words, the main data stream thus has an integrated subchannel for updating map information in the narrower sense. The full map data are sent in a highly compressed format. On account of the limited bandwidth, the transmission of the data can take days or even weeks, for which reason the relevant reception appliances 100 can monitor this data stream even in standby mode. In this way, it is possible to transmit not only the aforementioned traffic events but also important, longer-term known changes, e.g. in the road course or in the road properties (hazard spots, speed restrictions, number of lanes, etc.). Particularly these road properties can be transmitted in a compact format, and therefore the transmission thereof is an attractive option.

If necessary, this information can also be broadcast only regionally. In this case, the broadcast involves the use of only the satellites which are situated above the affected area or which can be received in the affected area.

By way of example, the update data can be sent accompanied by dynamic POIs. The dynamic POIs mark the start and end of changes in the central map, for example. Appropriate attributes relating to the POIs are used to store the changes. In this regard, the attributes also depict information such as the length of roadworks or the course of a new route. The use of dynamic POIs for updating digital maps means that it is not always necessary to make large changes to the software. Furthermore, these dynamic POIs also allow further functions, such as showing a warning for a collapsed bridge or tsunami.

Figure 3:
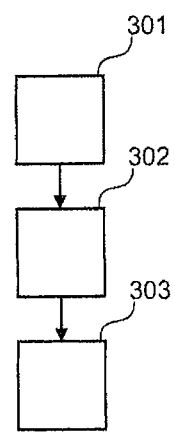
FIG. 3 shows a flowchart for a method based on an exemplary embodiment of the invention.

FIG. 3 shows a flowchart for a method based on an exemplary embodiment of the invention. In step 301, update data are sent from a control center to a Galileo satellite. In step 302, the update data are sent in parallel with the position data from the satellite to the relevant receivers. The update data are safety-critical map updates or safety-critical dynamic data. In step 303, the digital map data are updated at the relevant receiver.

The data are sent in similar fashion to TMC or using GPS positioning or using dynamic POIs. In addition, the map updates are transmitted continuously, i.e. over a relatively long period of time.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. A control center update system for use with a satellite positioning system (SPS) including an SPS satellite transmitting SPS positioning data that includes navigation signals, the update system for updating a digital map used by a vehicle, said control center comprising:
 a transmitter for transmitting update data to the SPS satellite in a single channel,
 wherein a receiver of the vehicle simultaneously receives
  1) the update data from the SPS satellite via an SPS satellite transmission sub-channel, and 2) the SPS positioning data that includes the navigation signals from the SPS satellite via an SPS satellite transmission main channel, the positioning data being generated by the SPS satellite, and wherein a processor of the vehicle updates the digital map on the basis of the received update data.

2. The control center as claimed in claim 1, wherein a data channel used for transmitting the update data is a subchannel of a main data channel in a satellite navigation system.

3. The control center as claimed in claim 1, wherein the satellite is in a Galileo satellite navigation system.

4. The control center as claimed in claim 1, wherein the update data are safety-critical data.

5. The control center as claimed in claim 1, wherein the update data are dynamic data.

6. The control center as claimed in claim 1, wherein the control center is configured to transmit the update data for one or more selected cells.

7. The control center as claimed in claim 1, wherein the control center is configured to transmit update data for a particular local area using an addressing function.

8. The control center as claimed in claim 7, wherein the addressing function is based on an NMEA string.

9. The control center as claimed in claim 1, wherein the control center is configured to regionally transmit the update data via a selected satellite.

10. The control center as claimed in claim 1, wherein the control center is configured to compress the update data prior to the transmission.

11. The control center as claimed in claim 1, wherein the control center is configured to persistently transmit the update data.

12. The control center as claimed in claim 1, wherein the update data are selected from a group comprising: safety-critical information, longer-term known changes in road course and/or road properties.

13. The control center as claimed in claim 1, wherein the receiver is configured to constantly receive the update data even in the standby mode.

14. A method for use with a satellite positioning system (SPS) including an SPS satellite transmitting SPS positioning data that includes navigation signals, the method for updating a digital map for a vehicle, said method comprising the following steps:

transmitting, from a transmitter of a control center to the SPS satellite, update data via a single SPS satellite data channel in a SPS satellite navigation system;

simultaneously receiving, by a receiver in the vehicle, 1) the update data from the SPS satellite via an SPS satellite transmission sub-channel, and 2) the SPS positioning data that includes the navigation signals from the SPS satellite via an SPS satellite transmission main channel, the SPS positioning data being generated by the SPS satellite; and updating, by a processor in the vehicle, the digital map on the basis of the received update data.

15. A non-transitory computer-readable medium which stores a computer program product which, when executed on a processor, instructs the processor to perform the following steps:

transmit, from a transmitter of a control center to a SPS satellite, update data via a single SPS satellite data channel in a SPS satellite navigation system;

simultaneously receive, by a receiver in the vehicle, 1) the update data from the SPS satellite via an SPS satellite transmission sub-channel, and 2) SPS positioning data that includes navigation signals from the SPS satellite via an SPS satellite transmission main channel, the SPS positioning data being generated by the SPS satellite; and update, by a processor in the vehicle, a digital map on the basis of the received update data.

* * * * *